United States Patent [19]

de Coninck et al.

[11] Patent Number: 5,208,061

[45] Date of Patent: May 4, 1993

[54] STARCH COMPOSITION

[75] Inventors: Valère L. M. P. de Coninck, Zelzate; André L. I. Rapaille, Knokke-Heist; Freddy M. L. Van der Schueren, Aalst, all of Belgium

[73] Assignee: Cerestar Holding B.V., Vilvoorde

[21] Appl. No.: 803,974

[22] Filed: Dec. 9, 1991

[30] Foreign Application Priority Data

Dec. 13, 1990 [GB] United Kingdom ............... 9027106

[51] Int. Cl.⁵ .................... A23L 1/0522; A23G 3/00
[52] U.S. Cl. .................... 426/573; 426/578; 426/658; 426/660
[58] Field of Search ............... 426/578, 658, 660, 573

[56] References Cited

U.S. PATENT DOCUMENTS

| | | | |
|---|---|---|---|
| 4,169,854 | 10/1979 | Igoe | 426/578 |
| 4,303,451 | 12/1981 | Seidel et al. | 426/578 |
| 4,592,919 | 6/1986 | Winters | 426/578 |
| 5,126,154 | 6/1992 | Beavais | 426/578 |

Primary Examiner—Jeanette Hunter
Attorney, Agent, or Firm—Cushman, Darby & Cushman

[57] ABSTRACT

A comparison which is suitable for use, particularly in hard gums, as a replacement for gum arabic, comprises a mixture, which is preferably agglomerated, of an extruded waxy starch, a low DE (e.g. 1 to 5) maltodextrin and enzymatically hydrolysed collagen. Most preferably the composition has 70 to 72% by weight extruded waxy starch, 17 to 19% by weight maltodextrin and 10 to 12% by weight of enzymatically hydrolysed collagen.

10 Claims, 1 Drawing Sheet

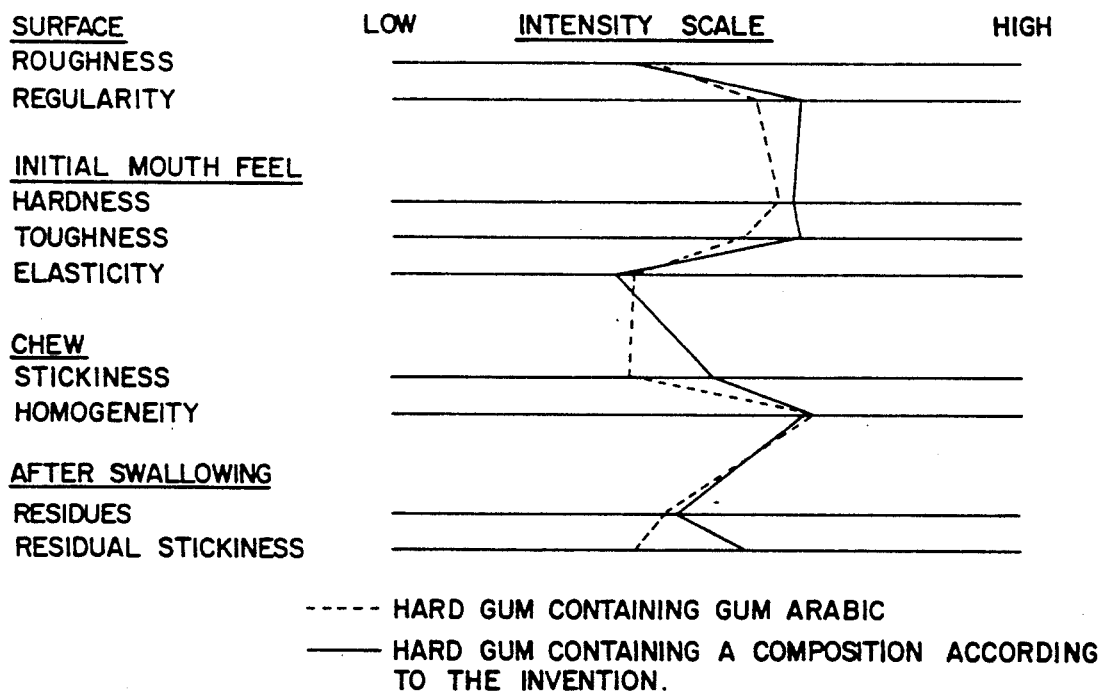

STARCH COMPOSITION

The present invention relates to a starch-containing composition and in particular to a composition which is suitable for use as a replacement for gum arabic in foodstuff applications.

Gum arabic is the dried exudate obtained from various species of trees of the genus Acacia of the Leguminosae family which are found in the tropical and semi-tropical areas of the world. The most important producing areas are the Republic of the Sudan and and some of the countries in West Africa.

Gum arabic is extensively used, particularly in the food industry e.g. as as the base for gum-containing confectionary products such as pastilles. In such applications gum arabic is difficult to replace and hence it is important that there should be a guarantee of supply of good quality product in sufficient quantity.

Unfortunately, the areas of the world from which gum arabic is obtained are are subject to climatic and political uncertainties which can lead to reductions or interruptions in the supply of the product. There is therefore a considerable incentive to find a total or partial replacement for gum arabic in at least some of its applications.

We have now found that for certain applications at least, and particularly in the production of gums and pastilles, gum arabic may be replaced partially or totally by a certain starch-containing composition.

Accordingly the present invention is a composition suitable for use as a replacement for gum arabic characterised in that it comprises a mixture of an extruded waxy starch, a low DE maltodextrin and enzymatically hydrolysed collagen.

Preferably the mixture is agglomerated.
Preferably the composition comprises
60 to 80% by weight of the composition of extruded waxy starch
12 to 25% by weight of the composition of maltodextrin
8 to 15% by weight of the composition of enzymatically hydrolysed collagen.
More preferably the composition comprises
70 to 72% by weight of the composition of extruded waxy starch
17 to 19% by weight of the composition of maltodextrin
10 to 12% by weight of the composition of enzymatically hydrolysed collagen.

By adopting the amounts of the components specified a composition is obtained which approximates closest to gum arabic in the mouth feel of the products in which it is used. More enzymatically hydrolysed collagen than the amounts specified can be tolerated without affecting the mouth feel but adherence to the specified limits of starch and maltodextrin is more critical.

The waxy starch which is used in the compositions according to the invention may alternatively be described as a high amylopectin starch which in this context means a starch containing more than 95% and generally about 98% by weight amylopectin. Although waxy starch may be obtained from a number of different plants e.g. waxy rice starch and waxy sorghum starch, it is preferred to use waxy corn starch.

The submission of the waxy starch to an extrusion process means that the starch has been heated under conditions of shear by passage through an extruder in which the starch is forced through a die by the action of one or more screws. The significant factors in the extrusion process are the water content of the starch, which is preferably 5% to 30% by weight, more preferably 10% to 20% by weight, and the temperature in the extruder. It is preferred that the temperature of the extruder barrel lies in the range 100° to 250° C., particularly about 200° to 210° C. The pH of the starch in the extruder is preferably in the range 3 to 7, particularly in the range 5 to 6.

The composition according to the invention is preferably agglomerated. The agglomeration process increases the particle size of the composition and provides a more even particle size distribution so giving better dispersibility and a more homogeneous product. The agglomeration process is carried out in general by spraying the composition with a binding agent, most suitably water, while keeping the particles in a state of agitation. The agitation leads to the growth of the particles by random coalescence and by crushing and layering. Once the particles have reached the desired size, preferably 0.2 to 1.5 mm diameter, the moisture is evaporated by hot air. In order to produce the best product it is preferred that the ratio of composition to water in the agglomeration process is in the range 10 to 25% e.g. about 14% based on the weight of the composition and that the product be dried at an air temperature of 80° C. to 100° C. and product temperature of 40° C. to 60° C.

The low DE maltodextrin preferably has a DE (dextrose equivalent) of less than 10, more preferably 1 to 5. The most suitable maltodextrin for the application is a low DE patato maltodextrin.

Enzymatically hydrolysed collagen is a known commercial product obtained by the selective enzymatic hydrolysis of collagen and consists of a mixture of water soluble proteins of high average molecular weight. It is different from gelatin which is obtained by the chemical hydrolysis of collagen and which is not an effective replacement for the enzymatically hydrolysed collagen in the compositions according to the present invention.

The composition according to the invention is of particular use as a replacement for gum arabic in the production of pastilles and gums, particularly hard gums. Such a gum may be prepared by a process in which water (20 to 30% by weight of the mixture) is heated to about 70° C. and a composition according to the invention (20 to 30% by weight of the mixture) slowly added to provide for complete dispersion of the starch. The aqueous composition is stirred for about 10 minutes after which sucrose (20 to 30% by weight of the mixture) and glucose syrup (20 to 30% by weight of the mixture) are added. The mixture is then pumped to a jet cooker where it is heated at a temperature of 119° C. for a few minutes, citric acid, flavour and colour being injected in the jet cooker as desired. The mixture is finally run into starch moulds where it is allowed to solidify. This process provides a hard gum containing 25 to 35% by weight of the gum of sucrose, 25 to 35% by weight of the gum of glucose syrup, 25 to 35% by weight of the gum of a composition according to the invention and 6 to 12% by weight of the gum of water.

The invention will now be further described with reference to the following Examples.

EXAMPLES

A series of starch compositions was prepared containing the ingredients shown below. The starch was waxy maize starch which had been extruded, the maltodextrin was a potato maltodextrin of DE 3 and the enzymatically hydrolysed collagen was the product sold under the trademark SOLUGEL P. Compositions A, B and D were agglomerated before use, compositions E and F were not agglomerated. The amount of water used in the agglomeration process was 14% by weight based on the composition.

The compositions were evaluated in comparison with gum arabic in a hard gum prepared using the method described earlier in this specification. The gum compositions and the results of the evaluation are presented in the following Table.

|  | A | B | C | D | E | F |
|---|---|---|---|---|---|---|
| Composition % w/w |  |  |  |  |  |  |
| Gum Arabic |  |  | 31.5 |  |  |  |
| Extruded, waxy maize starch | 17 | 17 |  | 19.5 | 17 | 19.2 |
| Potato maltodextrin (DE 3) | 4.3 | 4.3 |  |  | 4.3 | 4.3 |
| Solugel P | 2.7 | 2.7 |  | 2.8 | 2.7 |  |
| Sucrose | 25 | 25 | 23.5 | 27.8 | 25 | 25 |
| Glucose syrup | 25 | 25 | 23.5 | 27.8 | 25 | 25 |
| Liquorice solution (50% w/w) | 4 |  |  |  |  |  |
| Citric acid solution (50% w/w) |  | 0.1 | 0.1 | 0.1 | 0.1 | 0.1 |
| Water | 21.9 | 25.9 | 21.4 | 22.0 | 25.9 | 25.9 |
| Caramel colour |  | 0.1 |  |  |  |  |
| Preparation Conditions |  |  |  |  |  |  |
| (a) Mixing |  |  |  |  |  |  |
| Dispersion temperature °C. | 70 | 70 | 60 | 70 | 70 | 70 |
| Dispersion time (min) | 30 | 30 | 60 | 50 | 50 | 50 |
| Dry substance % w/w | 73 | 72.5 | 74 | 73 | 74 | 72 |
| Viscosity at 70° C. mPa · s | 13600 | 15000 | 9500 | 32000 | 22000 | 14000 |
| (b) Cooking (jet cooker) |  |  |  |  |  |  |
| Cooking temperature °C. | 120 | 117 | 119 | 119 | 117 | 117 |
| Dry substance % w/w | 68.5 | 67.5 | 69 | 68.5 | 68.5 | 68.5 |
| Moulding viscosity 80° C. mPa · s | 3000 | 2400 | 750 | 3700 | 2800 | 2600 |
| (c) Drying |  |  |  |  |  |  |
| After 52 hours at 60° C. |  |  |  |  |  |  |
| Gum texture | soft | soft | soft | v. soft | soft | soft sticky |
| Moisture % w/w | 10.2 | 10.1 | 9.5 | 10.5 | 10.3 | 10.5 |
| After 72 hours at 60° C. |  |  |  |  |  |  |
| Gum texture | hard | hard | hard | soft | hard | hard sticky |
| Moisture | 9.8 | 9.6 | 9.1 | 9.6 | 9.4 | 9.3 |
| (d) Sensory Evaluation |  |  |  |  |  |  |
| Surface |  |  |  |  |  |  |
| roughness | √ | √ |  | √ | √ | √ |
| regularity | √ | √ |  | √ | √ | √ |
| Initial Mouth Feed |  |  |  |  |  |  |
| hardness | √ | √ |  | X | √ | X |
| toughness | √ | √ |  | X | √ | X |
| elasticity | √ | √ |  | X | √ | X |
| Chew |  |  |  |  |  |  |
| stickiness | √ | √ |  | X | √ | X |
| homogeneity | √ | √ |  | √ | √ | X |
| After Swallowing |  |  |  |  |  |  |
| residues | √ | √ |  | √ | √ | √ |
| residual stickiness | √ | √ |  | X | √ | X |

√ means that the sample under test has approximately the same intensity of the property as the standard gum arabic.
X means that the sample under test differs significantly from gum arabic for the property.

Comparison of the hard gum preparation containing gum arabic (C) and the two starch compositions according to the invention (A and B) shows that similar intensities of the significant gum properties are obtained in the three cases. The compositions containing no maltodextrin (D) and no enzymatically hydrolysed collagen (F) produced gums with significantly different sensory properties from the standard gum arabic-containing product. The composition (E) which was not agglomerated has also acceptable sensory properties.

Sensory profiles of a hard gum made from gum arabic and a similar hard gum replacing the gum arabic by a composition according to the invention are shown in the diagram attached to this specification. The two profiles show a strong similarity.

We claim:

1. A composition suitable for use as a replacement for gum arabic which comprises a mixture of 60 to 80% of an extruded waxy starch, based on the weight of the composition, 12 to 25% of a low DE maltodextrin, based on the weight of the composition, and at least 8% of an enzymatically hydrolysed collagen, based on the weight of the composition.

2. A composition according to claim 1 which has been agglomerated.

3. A composition according to claim 1 in which the amount of enzymatically hydrolysed collagen is 8 to 15% by weight of the composition.

4. A composition according to claim 3 which comprises 70 to 72% of extruded waxy starch, based on the weight of the composition, 17 to 19% of maltodextrin, based on the weight of the composition, and 10 to 12% of enzymatically hydrolyzed collagen, based on the weight of the composition.

5. A composition according to any one of claims 1–4 in which the waxy starch is waxy maize starch.

6. A composition according to any one of claim 1-4 in which the maltodextrin is potato maltodextrin.

7. A composition according to any one of claims 1-4 in which the maltodextrin has a DE of 1 to 5.

8. A composition according to any one of claims 1-4 in which the composition has been agglomerated in the presence of water.

9. A composition according to any one of claims 1-4 which has been agglomerated and has a particle size in the range 0.2 to 1.5 mm.

10. A confectionary hard gum which comprises 25 to 35% of sucrose, based on the weight of the gum, 25 to 35% of glucose syrup, based on the weight of the gum, 25 to 35% of a composition according to any one of claims 1-4, based on the weight of the gum, 6 to 12% of water, based on the weight of the gum, and, optionally, citric acid, flavor and color to taste.

* * * * *